US011676425B2

(12) United States Patent
Borras et al.

(10) Patent No.: US 11,676,425 B2
(45) Date of Patent: Jun. 13, 2023

(54) SYSTEM AND METHOD FOR SPEECH RECOGNITION FOR OCCUPANCY DETECTION IN HIGH OCCUPANCY TOLL APPLICATIONS

(71) Applicant: GEOTOLL, INC., Cooper City, FL (US)

(72) Inventors: Jaime Andres Borras, Miramar, FL (US); Wyatt Drake Geist, Davie, FL (US)

(73) Assignee: GEOTOLL, INC., Cooper City, FL (US)

( * ) Notice: Subject to any disclaimer, the term of this patent is extended or adjusted under 35 U.S.C. 154(b) by 172 days.

(21) Appl. No.: 16/297,211

(22) Filed: Mar. 8, 2019

(65) Prior Publication Data
US 2019/0279437 A1    Sep. 12, 2019

Related U.S. Application Data

(60) Provisional application No. 62/640,178, filed on Mar. 8, 2018.

(51) Int. Cl.
*G07B 15/06* (2011.01)
*G06Q 50/30* (2012.01)
(Continued)

(52) U.S. Cl.
CPC .......... *G07B 15/06* (2013.01); *G06F 16/685* (2019.01); *G06Q 50/30* (2013.01); *G06Q 2240/00* (2013.01)

(58) Field of Classification Search
CPC ............ G06Q 10/00–30; G06Q 50/30; G06Q 2240/00; G07B 15/06; G06F 16/685
See application file for complete search history.

(56) References Cited

U.S. PATENT DOCUMENTS

| 4,336,522 A | 6/1982 | Graham |
| 5,920,057 A | 7/1999 | Sonderegger et al. |
| (Continued) | | |

FOREIGN PATENT DOCUMENTS

| DE | 102012215734 | 3/2014 |
| WO | 2013004864 | 1/2013 |

OTHER PUBLICATIONS

Shen, Jeffrey, "In-Vehicle Driver Detection Using Mobile Phone Sensors," Jun. 2011, Duke University, https://ece.duke.edu/sites/ece.duke.edu/files/GWDD2011_Shen.pdf (Year: 2011).*

(Continued)

*Primary Examiner* — Resha Desai
*Assistant Examiner* — Michelle E Carey
(74) *Attorney, Agent, or Firm* — The Concept Law Group, PA; Scott M. Garrett; Scott D. Smiley

(57) ABSTRACT

A system and method for dividing toll charges among vehicle occupants includes, at a mobile device, receiving identifying information for each vehicle occupant that can be used to verify the identity of the occupant. The identifying information can be biometric in nature, including images or voice prints. The information is provided to tolling service with which each of the occupants has an account. Toll charges that accrue as the vehicle travels are then divided or split among the vehicle occupants.

6 Claims, 11 Drawing Sheets

(51) Int. Cl.
*G06F 16/68* (2019.01)
*G06F 16/683* (2019.01)

(56) References Cited

U.S. PATENT DOCUMENTS

| | | | |
|---|---|---|---|
| 7,375,648 B1 | 5/2008 | Mulka et al. | |
| 7,742,941 B2 | 6/2010 | Yamauchi | |
| 11,008,017 B2* | 5/2021 | Roth | B60K 37/00 |
| 2002/0080014 A1 | 6/2002 | McCarthy et al. | |
| 2002/0140579 A1* | 10/2002 | Kavner | G07B 15/063 |
| | | | 340/988 |
| 2003/0115095 A1* | 6/2003 | Yamauchi | G06Q 20/26 |
| | | | 705/13 |
| 2005/0165795 A1* | 7/2005 | Myka | G06Q 10/1095 |
| 2005/0179563 A1 | 8/2005 | Kelley | |
| 2006/0015394 A1 | 1/2006 | Sorensen | |
| 2006/0155460 A1 | 7/2006 | Raney | |
| 2007/0278300 A1 | 12/2007 | Dawson et al. | |
| 2008/0175438 A1* | 7/2008 | Alves | G08G 1/0175 |
| | | | 382/105 |
| 2008/0277183 A1 | 11/2008 | Huang et al. | |
| 2009/0093932 A1 | 4/2009 | McCall et al. | |
| 2010/0026465 A1 | 2/2010 | Gravelle et al. | |
| 2010/0085213 A1 | 4/2010 | Turnock et al. | |
| 2010/0106567 A1 | 4/2010 | McNew et al. | |
| 2010/0161392 A1 | 6/2010 | Ashby et al. | |
| 2010/0201505 A1 | 8/2010 | Honary et al. | |
| 2010/0228608 A1* | 9/2010 | Hedley | G06K 9/00798 |
| | | | 705/13 |
| 2010/0295563 A1 | 11/2010 | Bieck et al. | |
| 2011/0090095 A1 | 4/2011 | Goldmann et al. | |
| 2011/0102156 A1 | 5/2011 | Gravelle et al. | |
| 2011/0137773 A1 | 6/2011 | Davis, III et al. | |
| 2011/0202393 A1 | 8/2011 | DeWakar et al. | |
| 2011/0208568 A1 | 8/2011 | Deitiker et al. | |
| 2011/0243449 A1* | 10/2011 | Hannuksela | G10L 17/00 |
| | | | 382/190 |
| 2012/0143786 A1 | 6/2012 | Karner | |
| 2013/0054281 A1 | 2/2013 | Thakkar et al. | |
| 2014/0180773 A1* | 6/2014 | Zafiroglu | G08G 1/0112 |
| | | | 705/13 |
| 2014/0278841 A1 | 9/2014 | Natinsky | |
| 2014/0310075 A1* | 10/2014 | Ricci | G06Q 30/00 |
| | | | 705/13 |
| 2015/0021389 A1 | 1/2015 | Gravelle | |
| 2015/0058016 A1* | 2/2015 | Goldstein | G06F 21/32 |
| | | | 704/246 |
| 2015/0331105 A1* | 11/2015 | Bell | G01S 17/89 |
| | | | 356/4.01 |
| 2016/0249156 A9* | 8/2016 | Varoglu | H04W 12/084 |
| 2016/0320198 A1* | 11/2016 | Liu | G01C 21/3438 |
| 2018/0094945 A1* | 4/2018 | Rosario | G08G 1/096716 |
| 2018/0211541 A1* | 7/2018 | Rakah | G08G 1/148 |
| 2019/0213513 A1* | 7/2019 | Seacat DeLuca et al. | |
| | | | G06Q 50/30 |

OTHER PUBLICATIONS

Metro Expresslanes Program, http://www.metro.net/projects/expresslanes/faq, last downloaded on Mar. 11, 2019.

\* cited by examiner

SYSTEM AND METHOD FOR SPEECH RECOGNITION FOR OCCUPANCY DETECTION IN HIGH OCCUPANCY TOLL APPLICATIONS

CROSS-REFERENCE TO RELATED APPLICATION

This application claims priority to U.S. Provisional Patent Application No. 62/640,178 filed Mar. 8, 2018, the entirety of which is hereby incorporated by reference.

FIELD OF THE DISCLOSURE

The present inventive disclosure relates generally to vehicular tolling systems, devices, and applications, and, more particularly, relates to a system and method for identifying vehicle occupants based on voice recognition for determining a toll rate to be used and for determining which occupant or occupants will pay the toll fee and how the toll fee is to be divided.

BACKGROUND

Vehicular traffic in metropolitan regions reaches a peak twice a day. These time periods have colloquially been referred to as "rush hour," even though they can last more than an hour. These time periods represent the time in the morning when people are commuting to their work place, and a time period in the late afternoon when people are commuting from their workplace back to their homes. During these times it is common for the high amount of traffic to cause delays just due to the number of vehicles sharing the roads. However, the high traffic volume also increases the chance for vehicular accidents to occur, which can further aggravate commuting conditions, and cause even greater delays, in addition to property damage and injury sustained by persons involved in such accidents.

Governmental authorities in these regions have sought to reduce commuter traffic, and to find ways to raise revenue to offset the cost of responding to accidents, among other costs associated with heavy traffic conditions e.g. road maintenance and construction. One approach has been to set up toll lanes as "express" routes along major commuter roadways. Drivers can use these lanes, for a toll fee, and bypass the congestion on the non-toll lanes. In order to provide an incentive for drivers to share rides, and reduce congestions, authorities have sought to provide discounts in these express lanes for vehicles with more than one occupant. Specially approved ride share vehicles are recognized by tolling authorities and receive a toll discount. These vehicles are generally vans that have been registered and approved for ride share use. The ride share vehicles are left at a publicly accessible location where the riders park their personal vehicles, and then transfer to the ride share vehicle, and ride together to another location such as an office building, or a public transportation hub.

The ride share vehicle model presents several problems, however. For one, riders still need to commute to the location where the ride share vehicle is located. Furthermore, riders typically agree to a scheduled departure time at both ends of the commute and if a given rider is unable to get to the ride share vehicle location, either the group must wait, or the rider has to make an alternate transportation arrangement.

Another way that authorities have sought to encourage ride sharing is with providing occupant quantity based discounts. For example, if a vehicle has two occupants, the toll rates can be discounted by 50%. Vehicles with four or more occupants can receive a 100% discount. No special vehicle is needed; people can use their own vehicles, allowing them to create ad hoc ride sharing arrangements. However, enforcement of occupant requirements for discounts has proven to be difficult. As a result of some people misrepresenting the actual number of occupants in a vehicle, there has been a substantial loss in revenue.

Therefore, a need exists to overcome the problems with the prior art as discussed above.

SUMMARY OF THE INVENTIVE EMBODIMENTS

The inventive disclosure provides a system and method for toll sharing that can include a variety of ways that the toll sharing can be initiated and verified, including voice identification, that overcomes the hereinafore-mentioned disadvantages of the heretofore-known devices and methods of this general type and that do not provide an ability to share tolls among occupants of a vehicle.

In accordance with some embodiments of the disclosure there is provided a system for verifying a number of occupants in a vehicle for tolling discounts which includes a mobile device configured to identify distinct voice prints of occupants in the vehicle, and to determine a number of occupant based at least in part on a number of distinct voice prints detected. The system can also include a backend server operated by a tolling service that is in communication with the mobile device, and which receives the number of occupants of the vehicle from the mobile device. The backend server determines a toll discount to be applied to toll charges for the vehicle based on the number of occupants in the vehicle for a conciliation procedure with a toll agency server.

In accordance with another feature of the system, the mobile device is configured to identify the distinct voice-prints of the occupants only when the mobile device determines that the vehicle is traveling above a threshold speed.

In accordance with another feature of the system, the mobile device is configured to identify the distinct voice-prints of the occupants only when the mobile device is paired with an audio system of the vehicle.

In accordance with another feature of the system, the audio system has an identifier that is used by the mobile device to identify a driver of the vehicle.

In accordance with another feature of the system, the mobile device is configured to identify the distinct voice prints in response to a bump action between the mobile device and another mobile device.

In accordance with another feature of the system, the backend server is configured to conduct a conciliation process with a tolling agency server to pay the tolling charges.

In accordance with another feature of the system, the system further includes a tolling transponder that is configured to be read by a toll reader, and that receives from the mobile device the number of occupants, wherein in response to being read by a toll reader the tolling transponder is further configured to provide an indication of a number of occupants in the vehicle to the toll reader.

In accordance with another feature of the system, the mobile device is further configured to detect acoustic noise in the vehicle and apply a noise cancelling process to identify the distinct voice prints.

In accordance with other embodiments of the disclosure, there is provided a method for splitting a vehicular toll among a plurality of occupants of a vehicle that includes producing at least one media file by a mobile device in the vehicle. The method can further include processing the at least one media file to determine a number of occupants in the vehicle, and indicating, to a tolling service server, an identity of each of the plurality of occupants of the vehicle, wherein each of the one of the plurality of occupants is associated with a respective unique tolling account with the tolling agency. The method can further include receiving, at the tolling service server from a toll reader, an indication that the vehicle has passed the toll reader; and in response to receiving the indication that the vehicle has passed the toll reader, the tolling service server apportioning a toll fee among the tolling accounts of the occupants of the vehicle.

In accordance with another feature of the method, producing the at least one media file comprises producing an image that includes a depiction of the occupants of the vehicle.

In accordance with another feature of the method, the at least one media file comprises producing a voice recording for each occupant of the vehicle.

In accordance with another feature of the method, producing the at least one media file comprises including identify information for each occupant of the vehicle, wherein the identity information corresponds to an account associated with each occupant at the tolling service server.

In accordance with another feature of the method, apportioning the toll fee is ceased upon an end of trip criteria occurring, wherein the end of trip is defined by at least one of a trip time, and end of trip location being reached, or a trip extension.

In accordance with another feature of the method, the end of trip criteria is programmed to recur for repetitions of the trip.

In accordance with another feature of the method, producing the media file is performed in response to a bump action between the mobile device producing the media file and another mobile device.

In accordance with another feature of the method, producing the media file includes an indication that the mobile device was paired with the vehicle over a personal area network link with the vehicle.

In accordance with other embodiments of the disclosure, there is provided a method for verifying a number of occupants of a vehicle for a high occupancy vehicle status verification including acquiring an image by a mobile device, wherein the image depicts the occupants of the vehicle while the mobile device is in wireless communication with at least one of a tolling transponder or an audio system of a vehicle. The method can further include the mobile device sending the image to a backend server of a tolling service, and the backend server processing the image using facial recognition to determine a number of persons depicted in the image, wherein the number of persons is used as the number of occupants. The method can further include the mobile device subsequently determining that the vehicle is traveling in a high occupancy lane. In response to determining that the vehicle is travelling in a high occupancy lane, the method can include mobile device associating a time of day and location information with a license tag number of a license tag of the vehicle. The method can further include detecting, by a toll reader positioned over the high occupancy lane, a presence of the vehicle, and confirming the presence of the vehicle in the high occupancy lane by comparing the time of day, location information, and license tag number associated by the mobile device with a license tag reading by the toll reader, and time of day when the license tag reading occurred. Further, the method can include assessing the vehicle a high occupancy discounted toll based on the number of occupants of the vehicle.

In accordance with other embodiments of the disclosure, there is provided method for creating a toll sharing session among occupants of a vehicle that can include, at a first mobile device, selecting a toll sharing option in a tolling application program interface. The method can further include the first mobile device transmitting a toll sharing beacon, and receiving at the first mobile device from a second mobile device, a response to the toll sharing beacon indicating the second mobile device is joining the toll sharing session. The method can further include transmitting to a tolling service backend by the first mobile device an indication of the toll sharing session.

In accordance with another feature of the method, the second mobile device also transmits to the tolling service backed server an indication of participation in the toll sharing session.

In accordance with another feature of the method, transmitting the toll sharing beacon and receiving the response to the toll sharing beacon are performed using a personal area network radio protocol.

Although the inventive disclosure is illustrated and described herein, and in a subsequently filed non-provisional patent application based on the disclosure herein, as embodied in a system and method for speech recognition for occupancy detection in high occupancy toll (HOT) applications, it is, nevertheless, not intended to be limited to the details shown because various modifications and structural changes may be made therein without departing from the spirit of the inventive disclosure and within the scope and range of equivalents of the claims. Additionally, well-known elements of exemplary embodiments of the inventive disclosure will not be described in detail or will be omitted so as not to obscure the relevant details of the inventive disclosure.

Other features that are considered as characteristic for the inventive disclosure are set forth in the appended claims. As required, detailed embodiments of the present inventive disclosure are disclosed herein; however, it is to be understood that the disclosed embodiments are merely exemplary of the inventive disclosure, which can be embodied in various forms. Therefore, specific structural and functional details disclosed herein are not to be interpreted as limiting, but merely as a basis for the claims and as a representative basis for teaching one of ordinary skill in the art to variously employ the present inventive disclosure in virtually any appropriately detailed structure. Further, the terms and phrases used herein are not intended to be limiting; but rather, to provide an understandable description of the inventive disclosure. While the specification concludes with claims defining the features of the inventive disclosure that are regarded as novel, it is believed that the inventive disclosure will be better understood from a consideration of the following description in conjunction with the drawing figures, in which like reference numerals are carried forward. The figures of the drawings are not drawn to scale.

Before the present inventive disclosure is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present inventive disclosure, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present inventive disclosure and simplify the description, but not to indicate or imply that the devices or components must have a specific azimuth, or be constructed or operated in the specific azimuth, which thus cannot be understood as a limitation to the embodiments of the present inventive disclosure. Furthermore, terms such as "first", "second", "third" and so on are only used for descriptive purposes, and cannot be construed as indicating or implying relative importance.

In the description of the embodiments of the present inventive disclosure, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present inventive disclosure according to the specific circumstances

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and explain various principles and advantages all in accordance with the present inventive disclosure.

DETAILED DESCRIPTION

Figure 1:
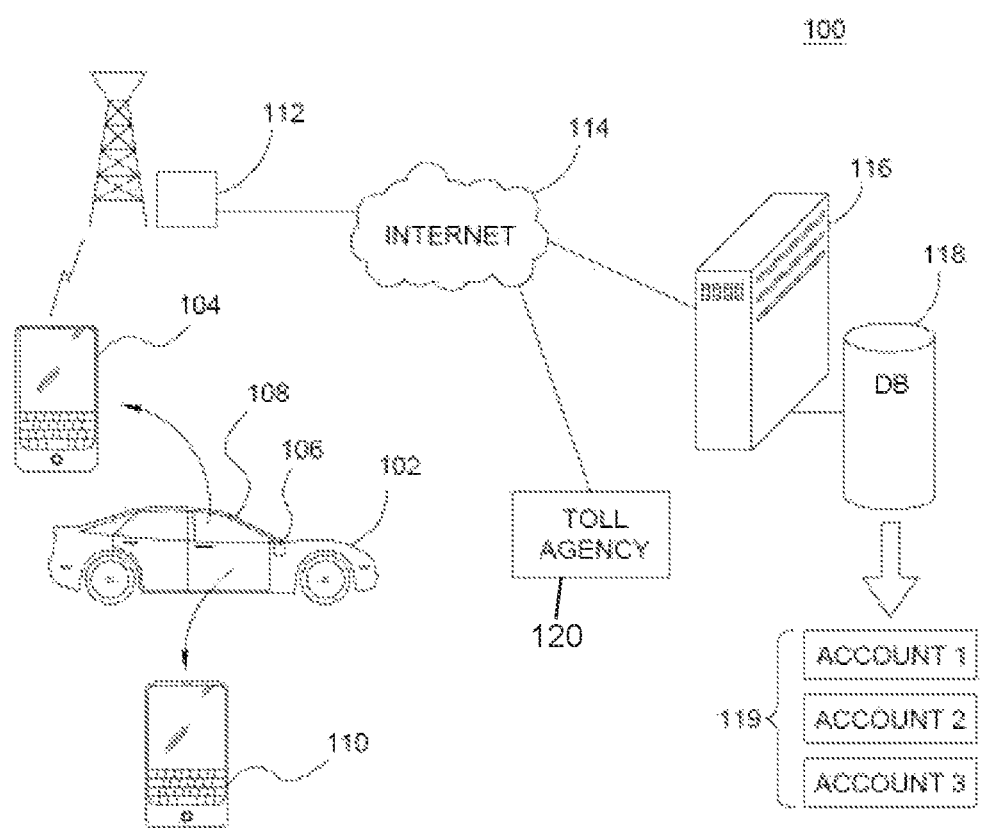
FIG. 1 is a system diagram of a tolling system for providing a toll discount by detecting multiple persons in a vehicle using voice detection, in accordance with some embodiments.

While the specification concludes with claims defining the features of the inventive disclosure that are regarded as novel, it is believed that the inventive disclosure will be better understood from a consideration of the following description in conjunction with the drawing figures, in which like reference numerals are carried forward. It is to be understood that the disclosed embodiments are merely exemplary of the inventive disclosure, which can be embodied in various forms.

High occupancy toll lanes (HOT) or express toll lanes for single occupancy vehicles can provide an effective way to bypass traffic for the user, and for the agency, a way to generate additional funding for the construction of new roads. HOT lanes may charge full price for single occupancy vehicles, half price for high occupancy vehicles with two or more occupants and nothing for high occupancy vehicles with three or more occupants. The vehicle owner or other occupant can set a specially designed programmable transponder on the windshield for reading by toll readers. The number of passengers in the car can be programmed manually into the vehicle transponder such that when it is read by the toll reader it transmits the number of occupants in the vehicle to the toll reader, along with other information such as the transponder identifier and/or account information, thereby informing the agency's reader and back office system (BOS) of the number of occupants for the proper charge as the vehicle RFID transponder is read. This can based on direct input from the owner of the vehicle and is a concern for enforcement since it is difficult for the enforcement officer to verify the number of passengers traveling in the vehicle with the actual number programmed in the transponder. To obviate this problem, the toll transponder can be designed such that it can only be programmed through an application on a connected mobile device that verifies the number of occupants.

FIG. 1 is a system diagram of a tolling system 100 for providing a toll discount by detecting multiple persons in a vehicle 102 using voice detection, in accordance with some embodiments. Although voice detection is used to detect the number of persons, there are also verification technologies used herein to assure that the correct number of occupants in a vehicle is determined. A driver or operator of the vehicle 102 can have a mobile device 104 which is capable of mobile wireless networked communication. The mobile device 104 can connect to cellular telephony networks by operating a radio transceiver according to a known air interface protocol. The mobile device can also include, in addition to a cellular transceiver, a personal area network (PAN) radio transceiver. The PAN transceiver operates at a much lower power level than a cellular transceiver and is configured to communicate with nearby devices directly. Examples of PAN protocols include those described by the Institute of Electrical and Electronics Engineers (IEEE) in specification 802.15, which include interfaces known commercially by the trade names BLUETOOTH, ZIGBEE, and others. The mobile device 104 will also typically include a WiFi transceiver for connecting to wireless local area networks such as those operating using the IEEE 802.11 specifications. The second mobile device 110 in the vehicle may belong to a second passenger.

The vehicle 102 can include a vehicle audio system 106 that allows connection using a PAN interface to operate the audio system 106 as a handsfree telephone in conjunction with mobile device 104, and to receive audio signals over the PAN interface that are played by the audio system 106 over speakers in the vehicle 102. The vehicle 102 can also include a tolling transponder 108 which includes a PAN transceiver and also a tolling transceiver for interacting with a toll reader. In another embodiment, tolling transponder 108 may not be present and the tolling service application uses GPS to confirm passing through the toll plaza. Each wireless networking transceiver, for both PAN and WiFi, in the mobile device 104, the audio system 106, and the tolling transponder 108, is assigned a unique media access controller (MAC) address or identifier. The MAC addresses are typically exchanged between devices during communication so that the device can determine the origin of any communications received. It is common that a mobile device such as mobile device 104 can be "paired" with a device such as the vehicle audio system 106. That is, the mobile device 104 and audio system 106 can go through a process that allows them to recognize each other and acts as authorization to communicate with each other and automatically establish a communication link whenever they detect each other's presence, as is well known.

The mobile device 104 includes a tolling application that uses the cellular transceiver of the mobile device 104 to communicate with toll service data center 116 over cellular network infrastructure equipment 112 and the internet 114. The toll service data center 116 maintains account records 119 in a database 118. Users of the toll service which operates the toll service data center 116 can set up accounts 119 with the toll service, which allows the toll service to settle toll charges for various toll agencies that operate toll roadways. Each account record 119 identifies a user (individual or organization), and associated information such as the user's vehicle license number(s), the user's email, phone number, and financial information to process toll transactions (e.g. credit card or other banking information). Furthermore, the account records can contain voice print information, and facial recognition information for matching voice and image samples to the account. So, for example, if vehicle 102 is travelling on a toll roadway operated by toll agency 120, the tolling transponder 108 will be read by a toll reader. The tolling transponder 108 can be linked to the mobile device 104 over a PAN link, and inform the mobile device 104, which is operating the tolling application program, of the toll transaction. The mobile device 104 can then contact the toll service data center 116 to arrange payment of the toll charge to the toll agency 120. Other techniques for tolling can be used equivalently, such as detecting, by the mobile device 104, passing a geolocation defined as a tolling point along a roadway.

Typically, the toll agency that collects the toll fees is a governmental agency. In order to encourage ride sharing to reduce traffic congestion the toll agency (e.g. toll agency 120) will discount the toll rate for vehicles with more than one person. This is known as "high occupancy" traffic because the typical commuter vehicle has only one person (the driver). In order to verify that the vehicle contains more than one driver a voice print of each occupant can be obtained. The voice print is an analysis of a recording of a person's voice. In some embodiments a voice print can be produced by having a person speak a particular utterance. The utterance can be a known pre-selected word, phrase, or nonce (e.g. a sound that is not a word or part of a language). A voice print can be produced from a recording of the speaker's voice. Characteristics of the speaker's voice can be used to identify the speaker, or at least distinguish the speaker from other people in the vehicle 102.

Accordingly, the system 100 of FIG. 1 includes a system for verifying occupants in a vehicle 102 for tolling discounts. The system 100 includes, in some embodiments, a tolling transponder 108 that is configured to be read by a toll reader and, in response to being read, provide an indication of a number of occupants in the vehicle to the toll reader upon being read. The toll transponder 108 obtains the occupant information from a connected mobile device 104 after the mobile device 104 performs processes to identify the occupants of the vehicle, which can include sampling a voice utterance by each person. The mobile device 104 is therefore in communication with the tolling transponder 108 and provides the number of occupants to the tolling transponder 108 based on identifying distinct voiceprints of occupants in the vehicle. The system 100 can further include a backend server (e.g. tolling service data center 116) operated by a tolling agency that is in communication with the mobile device 104, and receives an indication of the occupants of the vehicle from the mobile device 104 so that tolling charges can be split among the occupants. In another embodiment, tolling transponder 108 may not be present and the tolling service application uses GPS to confirm passing through the toll plaza.

Figure 2:
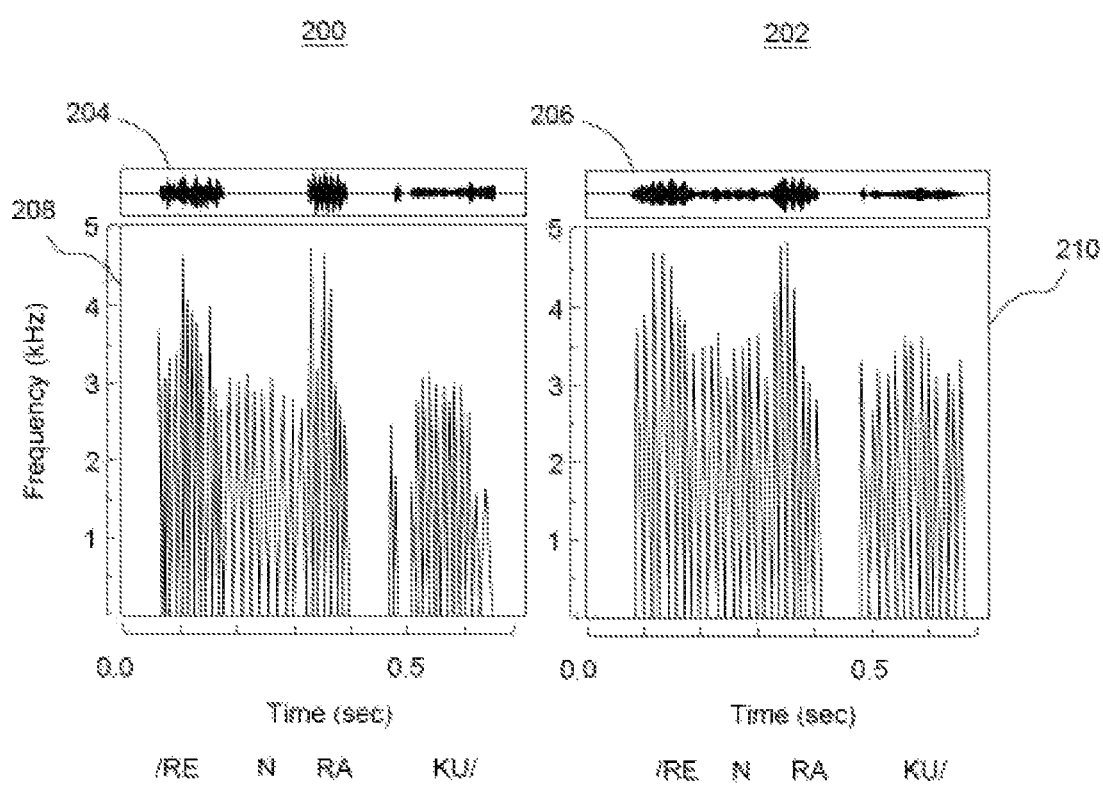
FIG. 2 is a comparison of voice patterns by two different people saying the same phrase to illustrate differences in voice patterns for use in voice detection to discount toll rates, in accordance with some embodiments.

FIG. 2 is a comparison of voice patterns by two different people saying the same nonce phrase, "renraku," to illustrate differences in voice patterns for use in voice detection to discount toll rates, in accordance with some embodiments. Each speaker is recorded saying the phrase to produce a first voice print 200 and a second voice print 202 for first and second speakers, respectively. The top graphs 204, 206 show voice amplitude over time, which is transformed into frequency over time in graphs 208, 210. For each voice print 200, 202, vocal characteristics can be determined for parameters such as pitch, spectral shape, and other characteristics relating to plosive and fricative formation, for example.

These parameters can be quantized to create a file that can be used with a matching algorithm to match an utterance to an identity.

In accordance with some embodiments, a sample of each person's voice can be used to verify their presence in the vehicle 102. The process of voice verification can be initiated, in some embodiments, by a "bump" action between mobile devices 104, 110. Mobile device 110 can belong to another occupant of the vehicle 102. A "bump" action occurs when the mobile device 104, 110 are physically bumped into each other while running the tolling application program, and then the users can be prompted to speak a given word or phrase into their respective mobile device. These voice samples can be used by the mobile device 104 or the tolling service data center 116 to identify the users. The tolling application program on each mobile device 104, 110 can use the PAN or WiFi transceivers to detect the presence of the other mobile device 104, 110, and further monitor an accelerometer for an output indicative of a sharp change in acceleration that occurs at the same time as a similar change in acceleration occurs in the other mobile device 104, 110. Upon detection of a deceleration event, each mobile device can communicate detection of the event, and if the times of the events detected at each mobile device 104, 110 are sufficiently close, it can be assumed that the mobile devices 104, 110 were bumped together. Thereafter each mobile device 104, 110 can prompt the respective user to speak. An interface can be presented on each mobile device which the user can use to queue recording of the user's voice as they speak the selected utterance. During the process the vehicle owner's mobile device 104 can be paired with the vehicle audio system 106, the tolling transponder 108, or both. The MAC address of each can be used to verify that the mobile device 104 is present with the vehicle 102. Further, in the bump process, the owner's mobile device 104 can transmit the MAC address of the audio system 106, tolling transponder 108, or both, to the other occupant's mobile device 110. The MAC address or addresses can be transmitted, along with the audio recording or voice print of the user's voice, to the toll service data center 116 to verify that the users are different people, that they are identified people (i.e. have a preexisting sample on record to compare against), and that the mobile devices are in the presence of the vehicle (whose MAC address(es) can also be on record). Voice print records and vehicle MAC addresses can be stored in the database 118 (e.g. in records 119) and used to verify vehicle occupant numbers for a toll rate discount. The process can be repeated for other users in the vehicle 102, and variation to the process can be utilized, as will be explained.

The voice print information for each occupant can be received at a mobile device such as mobile device 104 from other mobile devices such as mobile device 110 to produce a media file that include the voice print information, or extracted voice parameters that can be used to verify the identities of the speakers. The media file can include other information including the identities of the speakers to that their identity can be verified by the tolling service data center. The mobile device 104 can transmit the media file to a server at the tolling service data center for verification processing and to split tolling charge/toll fees among the verified occupants. Each time the vehicle passes a tolling point; the mobile device can receive a read conformation from the tolling transponder or the GPS Geo-fence and transmit a toll transaction indication to the tolling service data center for later use in conciliation processes with the toll agency in satisfying toll charges.

Figure 3:
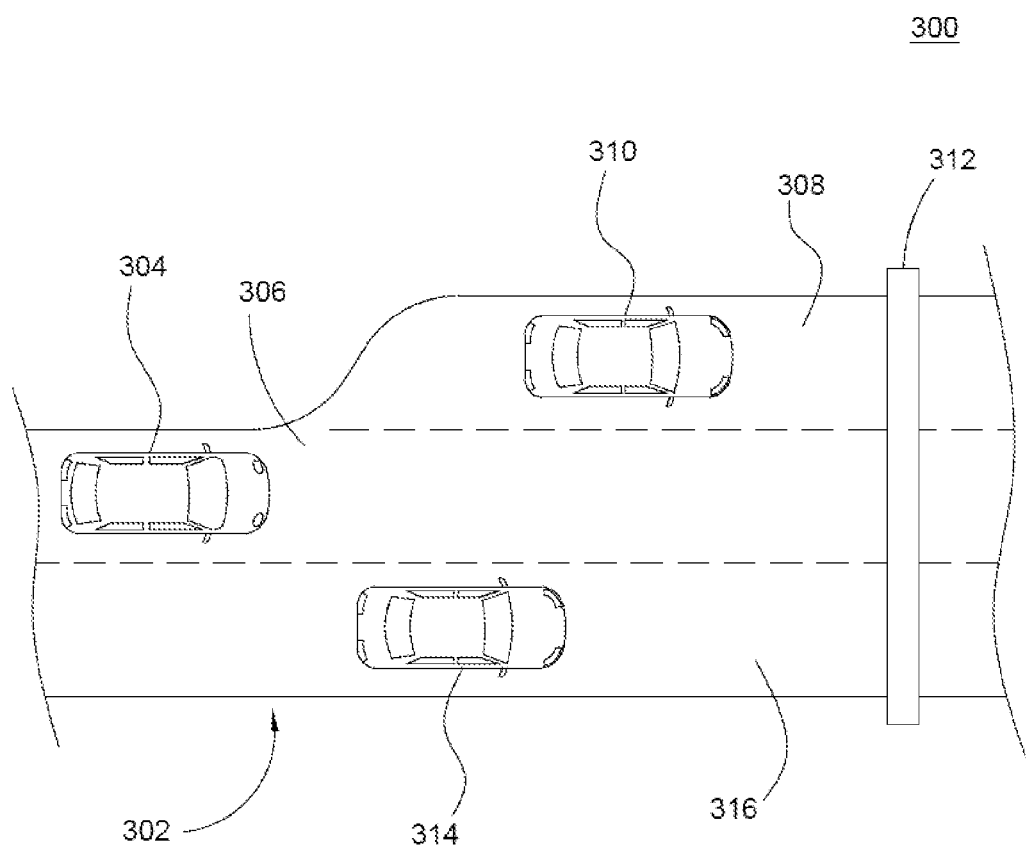
FIG. 3 is a roadway diagram showing a roadway having a dedicated tolling lane for which a toll rate can be discounted, in accordance with some embodiments.

FIG. 3 is a roadway diagram 300 showing a roadway 302 having a dedicated tolling lane 308 for which a toll rate can be discounted, in accordance with some embodiments. In general the roadway 302 can be a portion of a multi-lane highway which include multiple lanes 306, 308, 316 which have traffic all travelling in the same direction. Vehicles 304, 310, 314 utilize the lanes 306, 308, 316, respectively. The roadway 302 passes under a tolling point 312, which can include a toll gantry including toll readers that emit radio signals to prompt tolling transponders in vehicles passing under the gantry to respond, as is known. Lanes 306, 308, 316 can all be toll lanes, or lane 308 can be an express lane for which a toll is charged while lanes 306 and 316 are non-toll lanes. In accordance with the disclosure, the tolling rate charged for vehicles passing the tolling point 312 can be discounted based on the number of verified occupants of the vehicle. Rather than requiring a vehicle be pre-registered as a "high occupancy" vehicle (e.g. as in ride sharing vans), the disclosure allows an ad-hoc ability to receive discounted toll rates based on the number of occupants presently riding in a given vehicle. If the occupants of a given vehicle have not gone through the process of verifying the number of occupants riding in the vehicle, then it is charged at the default toll rate.

Figure 4:
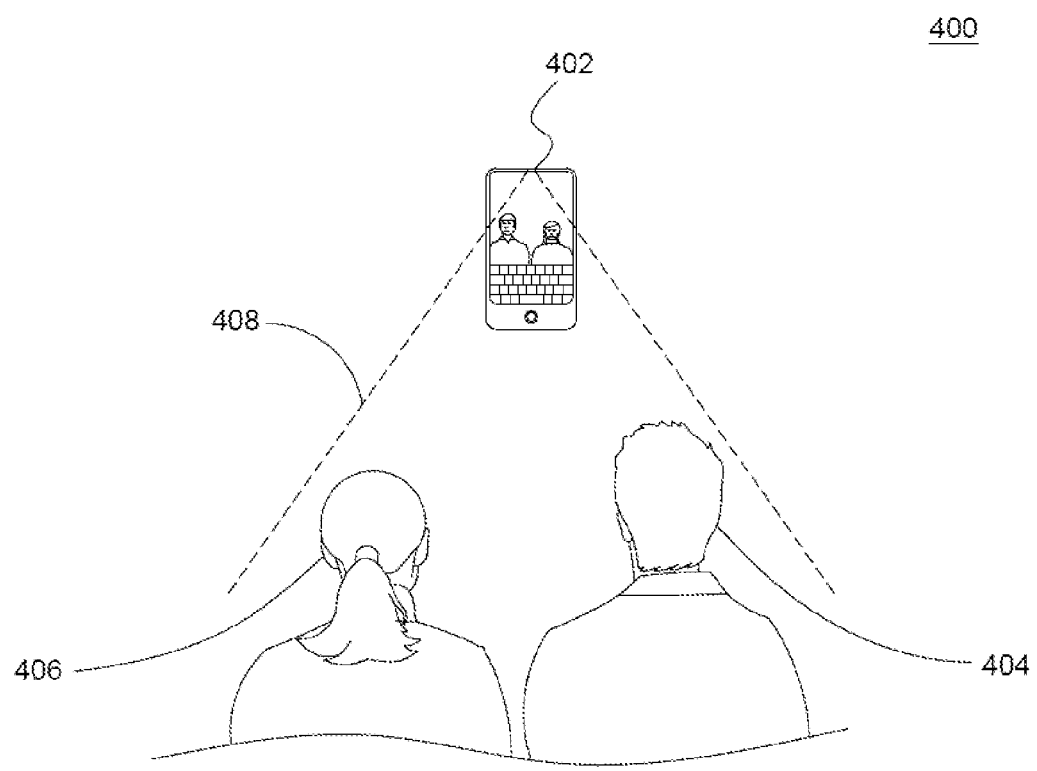
FIG. 4 shows a view diagram for using a camera to verify the number of persons in a vehicle, in accordance with some embodiments.

FIG. 4 shows a view diagram 400 for using a camera to verify the number of persons in a vehicle, in accordance with some embodiments. More particularly, the camera is a camera on a mobile device 402, and is used to take an image of persons 404, 406 in a field of view 408 of the camera. Using image recognition, the number of persons in the image can be determined and verified. In some embodiments the image can be captured while the mobile device 402 is also linked to a vehicle via a PAN transceiver link to ensure that the persons in the image are in the presence of the vehicle. The MAC address of the vehicle's PAN transceiver can be known by the tolling agency through account setup procedures. Alternatively, each person 404, 406 can have their image taken separately and their image processed using facial recognition to verify that they are different individuals.

Figure 5:
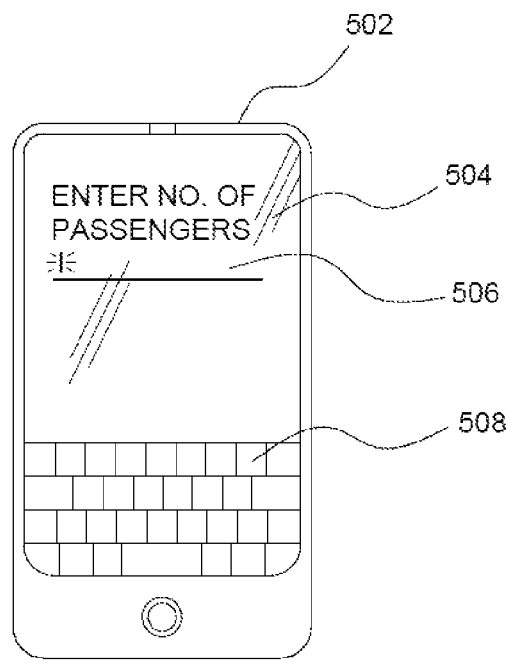
FIG. 5 shows a user interface for a tolling application in which a number of persons in a vehicle is entered manually to receive a toll rate discount, in accordance with some embodiments.

FIG. 5 shows a user interface diagram 500 for a tolling application in which a number of persons in a vehicle is entered manually to receive a toll rate discount, in accordance with some embodiments. In some embodiments it is contemplated that a tolling application program running on a mobile device 502 can allow a user to enter the number of occupants of a vehicle. The tolling application program can issue a prompt 504 and provide an input field 506 to receive a number using a keyboard 508 (or keyboard application program). The number can be used as a guide by the tolling application program in attempting to identify different individuals using, for example, voice and/or image recognition techniques. In some embodiments the number of occupants can be verified in other ways (e.g. each occupant using their own mobile device to verify their presence via the Low Energy Bluetooth, PAN), and in some embodiments simply entering the number is enough to satisfy the process and further verification is not used on the assumption that penalties for entering a false number will prevent most people from doing so.

Figure 6:
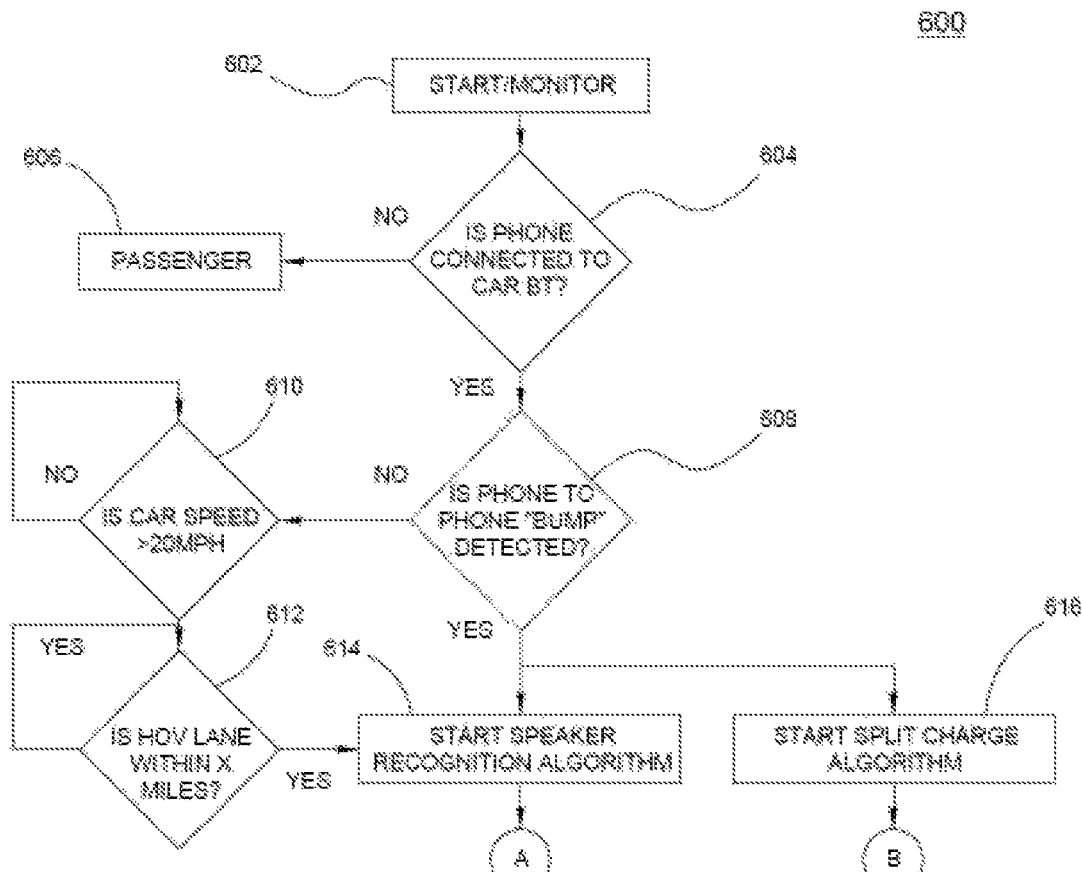
FIG. 6 is a flowchart diagram of a method to start occupant voice recognition and discriminator that can determine how to split charges among detected occupants, in accordance with some embodiments.

FIG. 6 shows a flowchart diagram of a method 600 to start occupant voice recognition and a discriminator that allow a determination as to how to split charges among detected occupants, in accordance with some embodiments. The method starts 602 by identifying automatically the vehicle driver and the passenger, such as by running a tolling application program on a mobile device, where the tolling application program operates using an account previously set up by the owner of the mobile device with a tolling agency. In step 604 the driver can be identified by, for example, the identity of the owner of the mobile device to which the toll transponder is paired using, for example, BlueTooth pairing. That is, upon running the tolling application program, if the mobile device is paired to a tolling transponder, or the audio system of a vehicle, then it is assumed that the mobile device belongs to the owner/operator of the vehicle. Otherwise, it can be assumed, at least initially, that the mobile device belongs to a passenger in step 606. In process 608 a process similar to that of the "bump" can be used to identify the mobile devices of other occupants in the vehicle. The bump application program uses near-field communication technology to identify and communicate with a nearby mobile device. In another embodiment, the mobile devices in close proximity (in the car) can be detected by Low Energy Bluetooth. This information can be communicated to a tolling agency backend (e.g. a data center) by the driver's mobile device along with the identity of the toll transponder so that the backend equipment can split the toll charges among the occupants, as well as applying a toll rate discount.

An alternative and concurrent process (concurrent with 608) can be carried out by processes 610, 612. In process 610 the tolling application program on the owner's mobile device can monitor the speed at which it is moving using, for example, a satellite positioning system on the mobile device (e.g. GPS). Until the speed exceeds some pre-selected threshold, such as, for example, 20 miles per hour, then process 610 stay in a loop. Once the threshold speed is reached, then process 612 can be initiated. In process 612, the tolling application program can monitor location of the vehicle, including the roadway on which the vehicle is traveling, using well known mapping/navigation techniques. If the vehicle is approaching a tollway for which a rate discount is available based on the number of vehicle occupants, then process 612 can likewise initiate process 614.

Process 614 is a process that serves as a training sequence for the speech recognition or biometrics sampling which can be activated to verify there are multiple different occupants and not just two mobile devices if additional occupants are present. Likewise, a process 616 can be initiated in response to the bump process 608 to split or share the toll fees among the occupants of the vehicle. In some embodiments, speaker-occupant detection only occurs when the vehicle is in motion (as detected, for example, by GPS location change similar to process 610). This ensures that the speaker-occupants are actually in the vehicle. In yet another embodiment, a toll Split Charge session can be started by any one of the occupants by their own choice or by following a respective notification. In method 600, the bump process 608 is shown as being employed, but it is also contemplated that this process can be eliminated and only the vehicle speed detection branch is used in method 600 in some embodiments.

Figure 7:
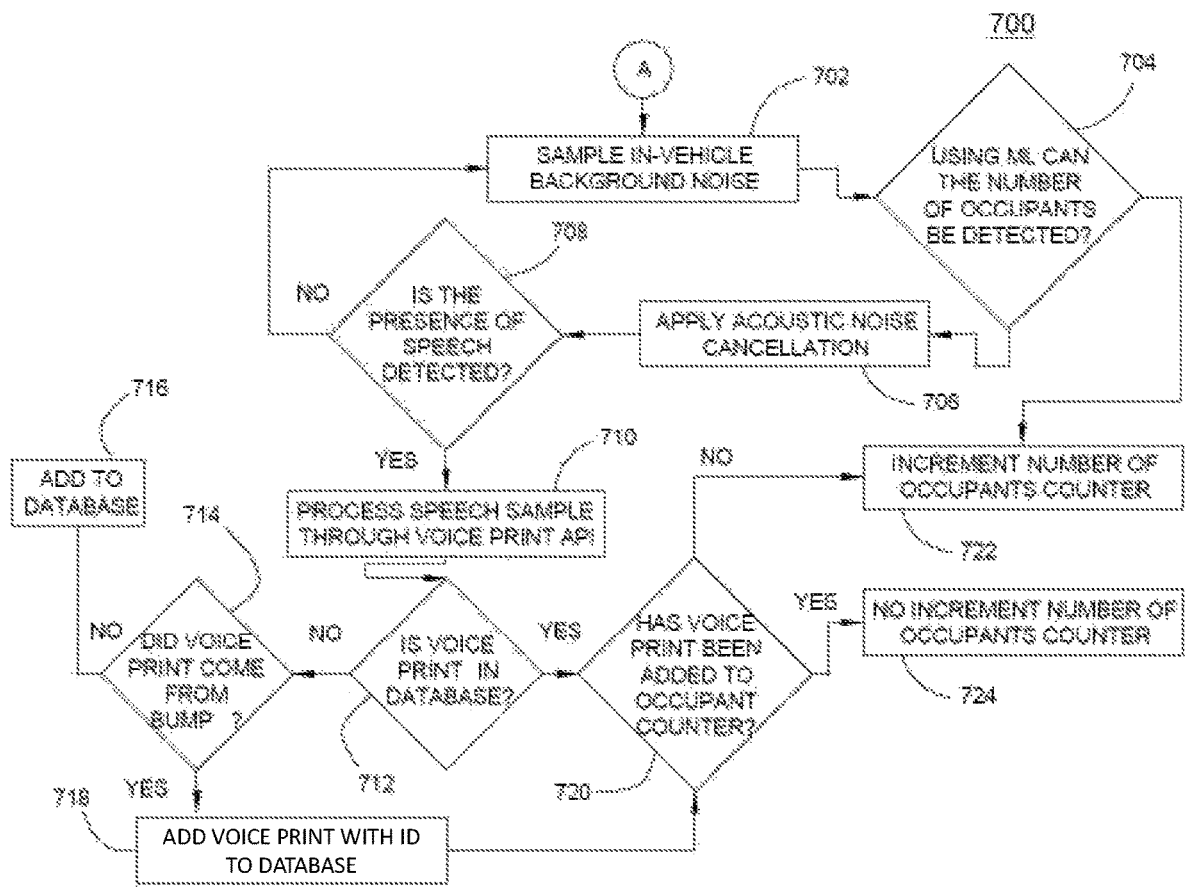
FIG. 7 is a flowchart diagram of a method that expands on the speaker recognition method of FIG. 6, in accordance with some embodiments.

FIG. 7 shows a flow chart diagram of a method 700 that expands on the speaker recognition method 600, starting by canceling the acoustical noise sources within the vehicle, as well as road noise, and processing captured speech samples elicited from vehicle occupants. Those skilled in the art will appreciate that the in-vehicle acoustic conditions vary with the number of occupants, and for this reason, using Machine Learning (ML) algorithms; the tolling application program can be configured to determine the number of occupants in the vehicle for toll discounting/splitting. However, the accuracy may vary depending on the vehicle's age and other properties, hence if the perceived outcome is not accurate, then, the method 700 can continues to sample the occupants' voice prints.

Accordingly, step 702 is initiated from method 600, and begins an in-vehicle determination of the background noise. This can be done, for example, by detecting persistent tonal sounds that correspond to wind and tire noise, but also by receiving audio from the vehicle audio system so that audio being played over the vehicle audio system can be subtracted from vehicle sound sampling conducted by the mobile device. Accordingly, after sampling the in-vehicle sounds in 702, in process 704 a voice recognition process that can utilize machine learning is used to identify occupants in the vehicle. A machine learning algorithm uses statistical analysis to match inputs with known records, and can adjust matching thresholds over time as more data is acquired. When, in process 704, the number of occupants cannot be determined from acoustic/voice identification, then process 706 is applied in an attempt to cancel some of the noise occurring in the vehicle. After applying the noise cancelling process 708 attempts to determine whether speech is presently discernable. This process may occur by, for example, sampling and analyzing received acoustic signals for a selected period of time. If end-process conditions are reached in process 708 and no speech is detected, and then processes 702, 704 can be repeated.

In process 708, when the process does determine that speech is detected, the method 700 proceeds to process 710 where the method 700 creates a voice print of the detected speech. The voice print is then analyzed in process 712 to determine whether the voice print sufficiently correlates with a known voice print stored in a database of voice prints. The database of known voice prints can be kept at a tolling service data center, or it can be local to the mobile device which keeps a smaller database of voice prints of friends and family members. In some embodiments a hybrid system can be used where the mobile device first checks if it can determine the identity of the speaker based on voice print information it contains, and if not, then the voice print parameters can be sent to the tolling service data center for further analysis and matching attempts.

When process 712 does not result in a match to a known speaker, then in process 714 if the voice print was produced in conjunction with a bump process, then the speaker is assumed to be the owner of the bumped mobile device, and the voice print data and speaker's identification are added to the database (local, remote, or both) in process 718. Alternatively, without the a priori information of the bump process (or an equivalent), then the voice print is merely added to the records/database in process 716 as a known but unidentified speaker.

When process 712 does result in identification of the speaker based on a previously created voice print, or after process 718, then in process 720 it is determined whether this particular speaker has already been counted as one of the occupants of the vehicle, presently. In process 722, the speaker has not already been counted, so the number of occupants is incremented. This is also performed after process 704 where the artificial intelligence/machine learning process identifies occupants. On the other hand, in process 724, the speaker has already been counted, so the number of occupants is not incremented.

Figure 8:
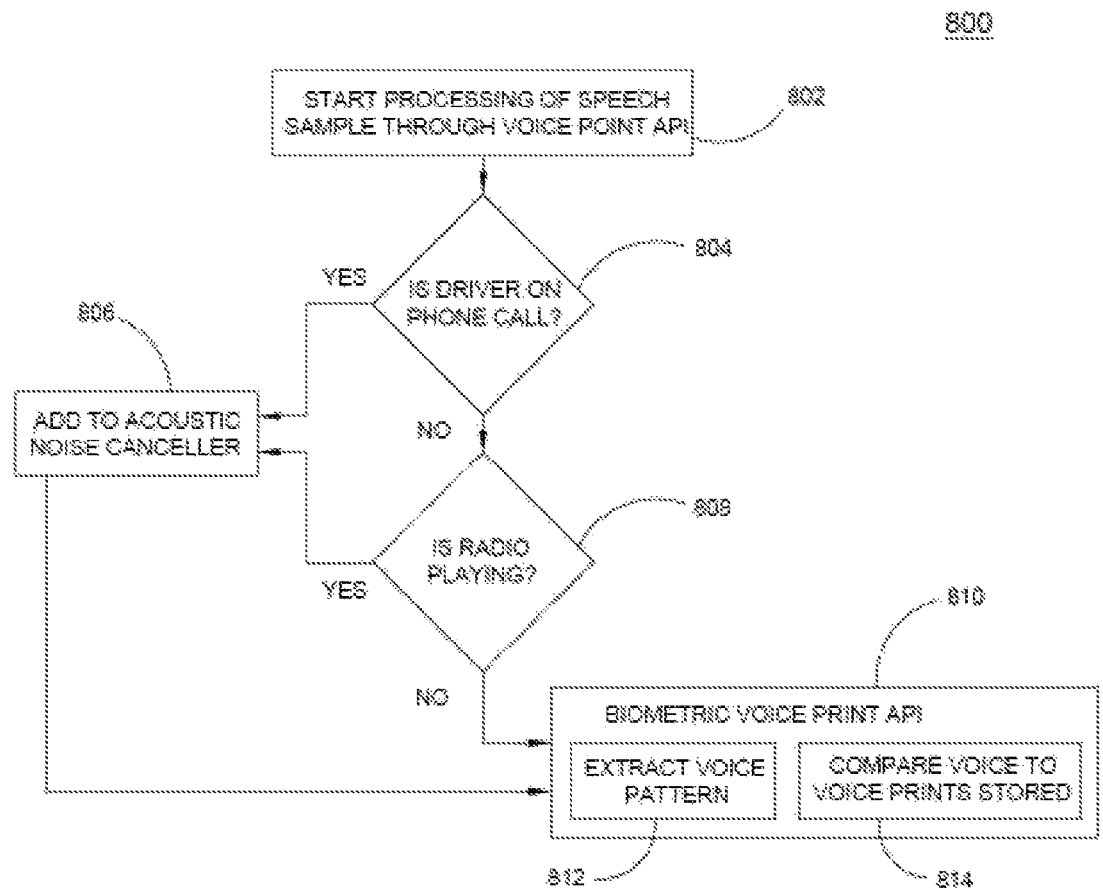
FIG. 8 is a flowchart diagram of a method for speech sample processing to determine a number of occupants in a vehicle, in accordance with some embodiments.

FIG. 8 is a flow chart diagram of a method for acquiring a voice sample from occupants in a vehicle by a mobile device when the mobile device is being used for a call or when there is other acoustic interference, in accordance with some embodiments. The method 800 can be performed, for example, as process 710 of FIG. 7. The mobile device, operating a tolling application, can distinguish the driver during a phone conversation and/or acoustic signals from the radio or audio system of the vehicle. Upon producing a speech sample, the sampled speech can then be processed by sending voice sample data to a biometric voice print API from the mobile device performing the method. A remote voice processing server can process received voice samples to extract the unique voice pattern to allow it to be compared with other voiceprints stored in a data base. If the voiceprint is not found in the database, it is then added, and if it had not been used to increment the occupant counter, then the occupant counter is incremented for the auto HOV declaration for the toll rate discount.

Accordingly, a tolling application program commences the method 800 in process 802 by recording acoustic signals received at the mobile device. In process 804, if the driver (owner of the mobile device) is presently using the mobile device to engage in a phone call (i.e. the cellular transceiver of the mobile device), then the driver's voice will dominate the acoustic input, and a filter can be created in process to block the driver's voice to cancel out the driver's voice. The filter can be applied in process 806 to identify other occupants of the vehicle. This does not mean that the driver's voice is cancelled in the audio data used for the call, rather that both the calling application program and the tolling application program both receive the same data from the microphone/audio input of the mobile device, and use the data differently and concurrently. Likewise, if the radio or vehicle audio system is presently on, as detected in process 808, the mobile device can receive information from the vehicle audio system to indicate such, and use audio data received, for example, over a PAN link between the mobile device and the vehicle audio system to formulate, in process 806, a noise cancelling filter. Applying the noise cancelling filter(s) in 806 speech is then acquired and passed to the voice print application program interface (API) in process 810. This is also the case when the driver is not using the mobile device to engage in a cellular call, and the vehicle audio system is off. A first sub-process 812 extracts a voice pattern from the received audio data to create a voice print. In a second sub-process 814, the voice print produced in sub-process 812 is compared to previously produced voice prints to see if there is a sufficient correlation with any of them.

Figure 9:
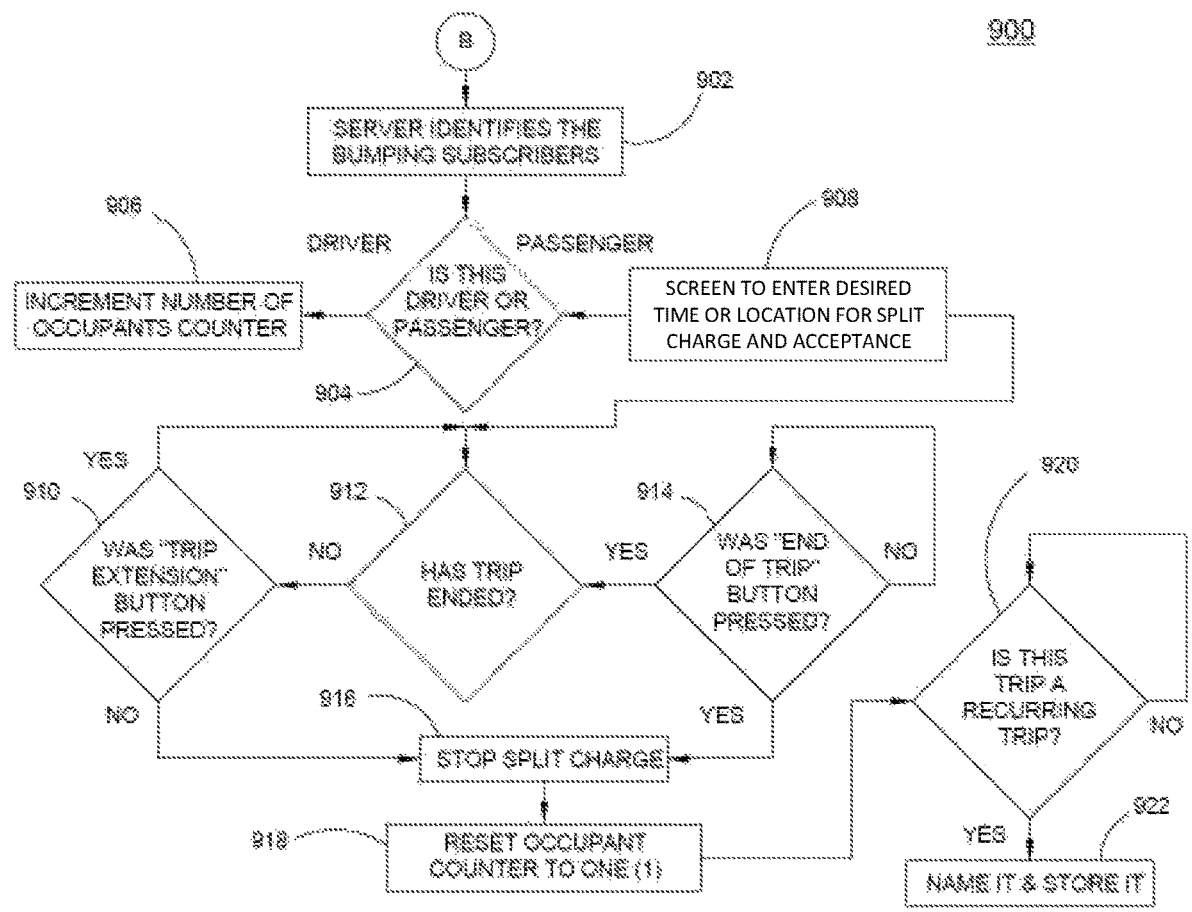
FIG. 9 is a flowchart diagram of a method to split toll charges among vehicle occupant tolling accounts, in accordance with some embodiments.

FIG. 9 shows a flowchart diagram for a method 900 to split toll charges among vehicle occupant tolling accounts, in accordance with some embodiments. The method 900 provides the unique options of selecting a desired timing for the split charge to be active, "end-of-trip" and expansion, and can be an option performed after performing method 600 of FIG. 6 (e.g. the "B" option after process 608). In a first step 902, after performing a bump process or similar exchange of identity, the information can be sent to the toll service data center where an appropriate backend server can identify the other party. In step 904 a determination is made as to whether the identified party is the driver or someone else. If it is the driver, then in step 906 the occupant counter is incremented. At this point no toll split is necessary as no other occupants have been identified. However, the process can be iterated for additional entities, which lead from step 904 to step 908 where an interface screen can be presented on the tolling application program for options regarding toll splitting among vehicle occupants, including a time (end time or duration), or a location. For example, the time period for which tolls incurred during the time period that are to be split can be identified. Likewise, if a location is entered, then the location can be determined and tracked by the mobile device, and when the location is reached the toll sharing can be terminated. Afterwards, in step 912, a determination can be made as to whether the initial trip is over, as specified in step 908. If the initial trip time is ended, then in step 910 the user can be prompted with a trip extension option in the tolling application program interface. If in step 912, the trip is not over, but the user indicates the trip is over, such as by input into the tolling application program interface (e.g. selecting a "stop trip" button), or if in step 910 the trip was not extended, then the method proceeds to step 916 where toll charge splitting is ended. That is, any further toll charges will be charged to the driver's account at full value, whereas during processes 910, 912, 914, the toll charges can be split among the occupants. It will be appreciated that in order to split the toll fees among the occupants, each occupant must have an account with the tolling service. When the occupants are identified during the toll sharing set up, they are identified by the tolling service data center. The non-driver occupants can receive a prompt at their own mobile device to accept the toll sharing. Furthermore, as multiple occupants are in the vehicle when toll splitting is performed, the toll fees may be discounted for high occupancy status.

At the end of the trip, in process 918, the occupant counter is reset to "1" for the driver, and tolls thereafter are charged fully to the driver. In step 920 the driver can be prompted on the driver's mobile device as to whether the trip is a recurring one (e.g. a daily commute). If so, then the driver can name and store the trip for future use where the trip period and toll splitting preferences can be re-used for future trips.

Figure 10:
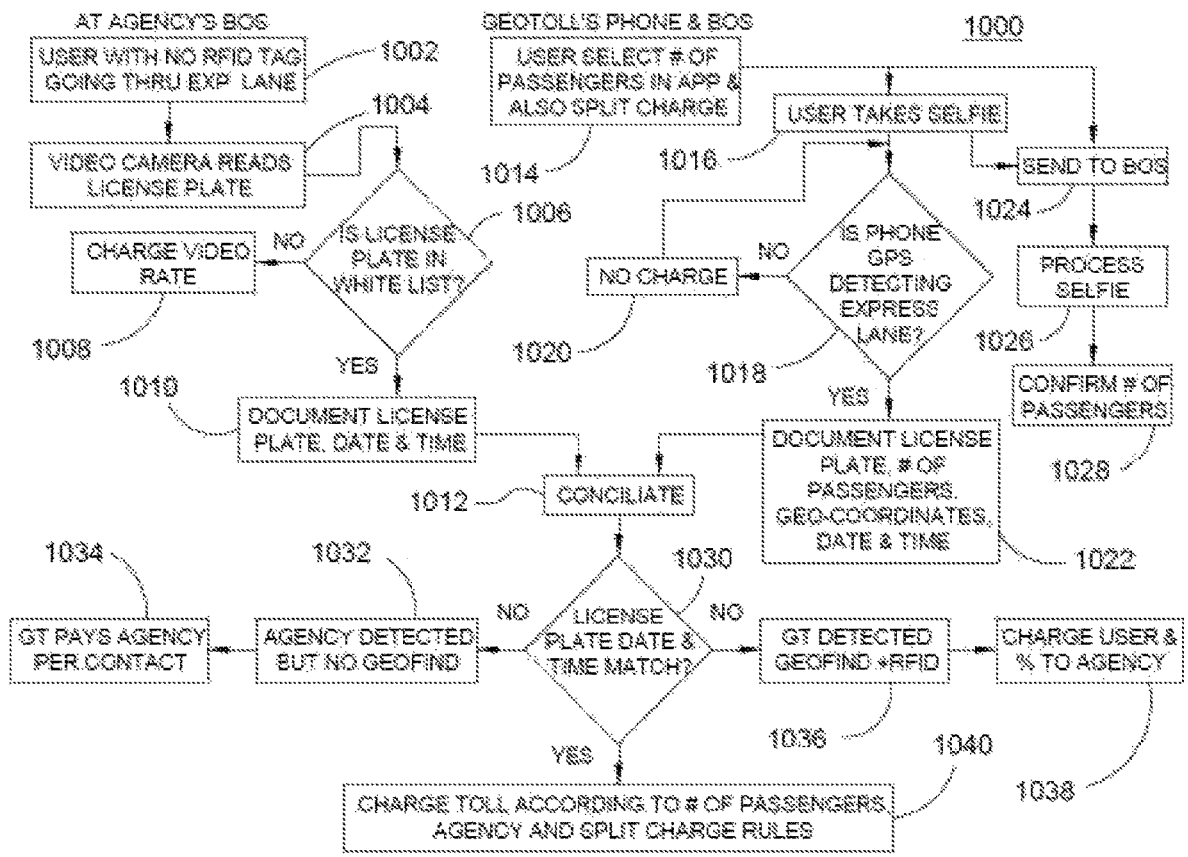
FIG. 10 is a flowchart diagram of a method for HOV lane use with manual operation, in accordance with some embodiments.

FIG. 10 shows a flowchart diagram of a method 100 for a short term HOV lane use with manual operation, in accordance with some embodiments. In general, the mobile device, using a tolling application program, can receive an input indicating the number of occupants/passengers in the car as entered manually by the driver (e.g. as in FIG. 5), and the driver can also enter the split charge participation information, if applicable, indicating the other occupants (who also have tolling accounts with the tolling service). The tolling application program can prompt the driver to take a picture of him/her-self (a "selfie"), insuring that all passengers are captured (as in FIG. 4, for example). This information (manual entry, captured image, etc.) is then sent to the tolling service data center for processing.

The method 1000 further entails identifying the number of occupants and also running facial recognition on the captured image to identity vehicle occupants as well as the number of vehicle occupants, based on the number of faces identified in the image. Once the number of passengers is confirmed from the manual entry and the "selfie," the verified occupant number information is used to charge the toll with any applicable discount, as well as to split the toll (if any) among the occupants.

The method 1000 starts with two parallel input branches with a first input branch including steps 1002-1010 that occur at a toll agency. The toll agency is the toll authority that operates the toll gantries and other tolling infrastructure, and that receives collected toll fees. A second input branch includes steps 1014-1028, and is performed at a vehicle and partly at the tolling service data center. Steps 1012 and 1030-1040 represent the settlement process where the tolling agency is paid.

In step 1002 a vehicle without a tooling transponder (no RFID tag) passes through a tolling location, such as, for example, a gantry over a defined express lane. Since there is no tolling transponder to read, the toll reader in the gantry will not receive any transponder information. In step 1004, as is common, a photographic process can be used to acquire or read the vehicle's license plate. In step 1006 the license plate number is compared to a white list of license plate numbers associated with tolling services. Vehicles of people who use a tolling service will later have their tolling charges settled through the tolling service. Those license plate numbers that are not on the white list are charged the standard rate in step 1008. An invoice can be sent to the vehicle owner, or the license number may be associated with an account maintained by the toll agency. When the license number is one that is white listed, then in step 1010 the number, date, and time are recorded (as with non-white listed numbers), and then the tolling agency waits for a conciliation process with the tolling service in step 1012.

Users of a tolling service, in order to split toll fees and to receive a multi-occupant discount can first indicate a number of occupants in the vehicle in step 1014. The process for step 1014 is performed at a user's mobile device which is running a tolling application program designed to operate according to the methods and principles taught by the present disclosure. In step 1014 the user can manually enter the number of passengers/occupants. The process for step 1014 can include voice identification that can be performed concurrently or subsequently to entering the number of occupants. The process for step 1014 can include a bump process for verifying the other occupants' presence while the mobile device is paired with the vehicle or toll transponder. In step 1016 the user can take a picture of the people (a "selfie") in the vehicle using the mobile device. The mobile device can verify that it is presently paired with the vehicle or tolling transponder (e.g. by verifying the MAC address). In step 1024 the information regarding the number occupants can be sent to the tolling service data center back-office server (BOS). If the user has taken an image in step 1016 then the image can also be forwarded to the BOS also in step 1024. Further, the identity of the occupants can be forwarded. The identity information can include account information for each occupant for accounts they each have with the tolling service. The identity information can be input manually or by a bump process, or by the other occupants using their mobile device to indicate to the BOS that they are traveling with the vehicle owner. In step 1026 the BOS can use the information sent, including the image, to verify the number of occupants in the vehicle. This can include processing the image using facial recognition to identify distinct persons. In step 1028 the number of occupants can be verified by the BOS based on the information received, including the output of step 1026. The process for step 1028 can also include verifying voice print identification and the indicated number of occupants. In some embodiments step 1024 can be repeated iteratively if additional information is acquired by the mobile device, such as identifying an additional person's voice. Upon determining the number of occupants in the vehicle, and the identity of the occupants, the BOS can then split toll fees among the occupants and apply any available multi-occupant discount that can be applied to toll fees.

In step 1018, which is performed by the mobile device in the vehicle as the vehicle is traveling; the mobile device uses location information and mapping/navigation to determine if the vehicle is in an express lane for which a toll is charged, or some other toll roadway. Step 1020 indicates that the mobile device has not determined that the vehicle is on a toll roadway. When the mobile device has determined that the vehicle is traveling on a toll roadway, then the mobile device commences, in step 1022, to record the number of occupants detected/indicated by the mobile device, vehicle information (e.g. plate number), as well as geo-coordinates, date and time. This information can be formatted in a toll transaction record for use in the conciliation process of step 1012. Specifically, at the end of a trip, the mobile device can transmit toll transaction records to the BOS for use in the conciliation process.

In the conciliation process 1012, which is conducted between the toll agency and the tolling service, the toll agency will have records of vehicles on the toll road(s) for which a toll fee is to be assessed. The conciliation process includes, in step 1030, determining whether there is a match between records at the toll agency for vehicles that are to be assessed a toll fee, and toll transaction records produced by mobile devices in vehicles that have passed tolling locations. When there is a match, as indicated by, for example, date and time, location, then in step 1040, for that record, the toll fee is paid by the tolling service to the toll agency based on the number of occupants and any toll discount for multi-occupant vehicles. The tolling service assesses the split fee in proportion to each account holder in the vehicle, as agreed by the account holders.

When, in step 1030, there isn't a license plate number and date and time match for a given record, then the method 1000 can take one of two paths, depending on whether the other information provides a match. In step 1032, for example, the tolling service is identified but there isn't a geolocation match, in which case in step 1034 the tolling service pays the toll agency the toll fee and applies the toll fee to the account holder of the license plate based on the date, time, and location indicated by the toll agency record. However, if there is a geolocation match and the RFID identifier of a corresponding tolling transponder match, as in step 1036, then step 1038 is performed where the user is charged and the appropriate proportion of the toll fee is transferred to the toll agency.

Figure 11:
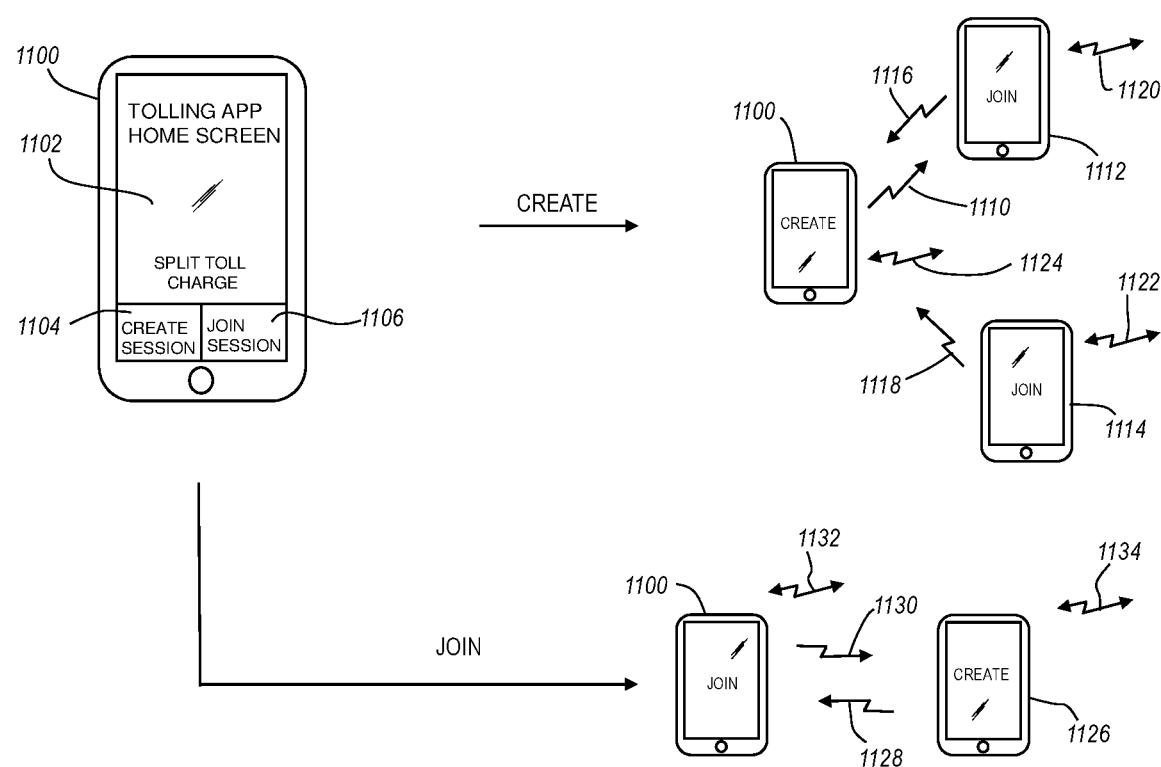
FIG. 11 is a toll sharing session for creating and joining a toll sharing session, in accordance with some embodiments.

FIG. 11 is a toll sharing session for creating and joining a toll sharing session, in accordance with some embodiments. A mobile device 1100 has a tolling application program installed and running which provides a toll sharing session interface 1102, among other interfaces. In the toll sharing session interface there are provided two options that the user can select, a create session button 1104 and a join session button 1106. If the user selects the create button 1104 then the tolling application program initiates a toll sharing session as indicated by the "CREATE" arrow. The mobile device 1100 then emits a beacon 1110 using a PAN transceiver (e.g. Low Energy BLUETOOTH). The beacon 1110 can be detected by other mobile devices 1112, 1114, each of which are running a similar tolling application program that are in a join mode. The joining mobile devices 1112, 1114 transmit a join response 1116, 1118, respectively, which are received by the session creating mobile device 1100. Each mobile device 1100, 1112, 1114 also confirm with the tolling service data center backend that they are entering a toll sharing session in cellular data transmissions 1120, 1122, 1124 which can identify each of the other accounts or mobile devices participating in the session, or a toll sharing session identifier created by the initiation mobile device 1100. Furthermore, during session creation, the creating mobile device 1100 can be paired with the vehicle or a toll transponder which is used for charging tolls (e.g. license plate number or RFID) by a tolling agency. The tolling service backend server will then discount and split tolls amount the accounts associated with users of mobile devices 1100, 1112, 1114.

To join a session, the user of the mobile device selects the join button 1106, and the join procedure is then followed, as indicated by the "JOIN" arrow. To join a session initiated by another mobile device 1126, mobile device 1100 first looks for a beacon 1128. Upon receiving the beacon 1128, mobile device 1100 will display an identification of the mobile device 1126 and prompt the user of mobile device 1100 to join or not join the toll sharing session. When the user selects a join option, then the mobile device 1100 transmits a response 1130 to mobile device 1126 indicating that the user of mobile device 1100 is joining the toll sharing session initiated by mobile device 1126. After joining/initiating the toll sharing session, each of the mobile devices 1100, 1126 can transmit confirmation or otherwise an indication that the users associated with the accounts being accessed by the mobile devices 1100, 1126 are joining together in a toll sharing session to the toll service backend in cellular data signals 1132, 1134.

The toll sharing sessions initiated and joined by the account holders of the tolling service using their mobile devices can be defined in time, location, or either. That is, the toll sharing can end when the group arrives at a selected location, which can be determined by the mobile devices. Likewise the toll sharing can be terminated after a selected time of day. It is contemplated that users can leave the toll sharing session prior to the selected end of session conditions by simply indicating to the tolling service backend that the user is leaving the toll sharing session. Likewise, new account holders can join a session in progress by having the initiating mobile device, or any of the other mobile devices of the users in the toll sharing session, transmit a join beacon and joining the toll session as described. It will also be appreciated by those skilled in the art that the beaconing can be reversed, where, for example, mobile device initiates the toll sharing session by looking for "join" beacons transmitted by the joining mobile devices and then adds them to the toll sharing session by accepting them on the interface of the mobile device 1100.

Accordingly the disclosed embodiments provide the benefit of providing a discounted toll fee for multi-occupant vehicles in a way that tends to ensure that the vehicle actually has the indicated number of occupants. This alleviates concerns by toll agencies that operate and collect tolls that people using a tolling service are accurately reporting the number of occupants. Furthermore, the disclosed embodiments provide for tolling service that can apportion toll fees among tolling service account holders who travel together in a vehicle in a way that ensures the identity of the account holders.

What is claimed is:

1. A method for splitting a vehicular toll among a plurality of occupants of a vehicle, comprising:
    a mobile device, in response to executing a tolling application program, determining that the mobile device is paired with a vehicle audio system and that the mobile device has received information from another mobile device in a bump operation; responsive to determining that the mobile device is paired with the vehicle audio system and further in response to executing the tolling application program, the mobile device verifying that a first person is present in the vehicle by prompting a first person to speak a pre-selected utterance and the mobile device recording a voice of the first person speaking the pre-selected utterance;
    responsive to determining that the bump operation has occurred, and further in response to executing the tolling application program, the mobile device verifying that a second person is present in the vehicle by prompting a second person to speak the pre-selected utterance and the mobile device recording the voice of the second person speaking the pre-selected utterance;
    further in response to executing the tolling application program, the mobile device creating a first voice print from the recording of the voice of the first person and a second voice print from the recording of the voice of the second person;
    further in response to executing the tolling application program, identifying the first person based on the first voice print, and identifying the second person based on the second voice print;
    further in response to executing the tolling application program, the mobile device transmitting, responsive to identifying the first person and identifying the second person, to a tolling service server by the mobile device via a cellular network, the identity of the first person and the identity of the second person, wherein the first person is associated with a first tolling account and the second person is associated with a second tolling account of a tolling agency that operates the tolling service server;
    receiving, at the tolling service server from a toll reader, an indication that the vehicle has passed the toll reader; and in response to receiving the indication that the vehicle has passed the toll reader, the tolling service server apportioning a toll fee among the first and second tolling accounts.

2. The method of claim 1, wherein apportioning the toll fee is ceased upon an end of trip criteria occurring, wherein the end of trip is defined by at least one of a trip time, and end of trip location being reached, or a trip extension.

3. The method of claim 2, wherein the end of trip criteria is programmed to recur for repetitions of the trip.

4. The method of claim 1, further comprising:
    the mobile device determining a speed of the vehicle;
    and wherein verifying that the first person and the second person are present in the vehicle is only performed when the mobile device has determined that the vehicle speed is above a pre-selected threshold speed.

5. A method for splitting a vehicular toll among a plurality of occupants of a vehicle, comprising:
    a mobile device, in response to executing a tolling application program, determining that the mobile device is paired with a vehicle audio system and that the mobile device has received information from another mobile device in a bump operation;
    responsive to determining that the mobile device is paired with the vehicle audio system, and further in response to executing the tolling application program, the mobile device verifying that a first person is present in the vehicle by prompting the first person to speak and the mobile device recording a voice of the first person;
    responsive to determining that the bump operation has occurred, and further in response to executing the tolling application program, the mobile device verifying that a second person is present in the vehicle by prompting the second person to speak and the mobile device recording a voice of the second person;
    further in response to executing the tolling application program, the mobile device creating a first voice print from the recording of the voice of the first person and a second voice print from the recording of the voice of the second person;
    further in response to executing the tolling application program, identifying the first person based on the first voice print, and identifying the second person based on the second voice print;

further in response to executing the tolling application program, the mobile device transmitting, responsive to identifying the first person and identifying the second person, to a tolling service server, the identity of the first person and the identity of the second person, wherein the first person is associated with a first tolling account and the second person is associated with a second tolling account of a tolling agency that operates the tolling service server;

receiving, at the tolling service server from a toll reader, an indication that the vehicle has passed the toll reader;

and in response to receiving the indication that the vehicle has passed the toll reader, the tolling service server apportioning a toll fee among the first and second tolling accounts.

6. A method for splitting a vehicular toll among a plurality of occupants of a vehicle, comprising:

a mobile device, in response to executing a tolling application program, determining that the mobile device is paired with a vehicle audio system and that the mobile device has received information from another mobile device in a bump operation;

responsive to determining that the mobile device is paired with the vehicle audio system, and further in response to executing the tolling application program, the mobile device verifying that a first person is present in the vehicle by prompting a first person to speak a pre-selected utterance and the mobile device recording the voice of the first person speaking the pre-selected utterance;

responsive to determining that the bump operation has occurred, and further in response to executing the tolling application program, the mobile device verifying that a second person is present in the vehicle by prompting a second person to speak the pre-selected utterance and the mobile device recording the voice of the second person speaking the pre-selected utterance;

further in response to executing the tolling application program, the mobile device creating a first voice print from the recording of the voice of the first person and a second voice print from the recording of the voice of the second person;

further in response to executing the tolling application program, identifying the first person based on the first voice print, and identifying the second person based on the second voice print;

further in response to executing the tolling application program, the mobile device transmitting, responsive to identifying the first person and identifying the second person, to a tolling service server, the identity of the first person and the identity of the second person, wherein the first person is associated with a first tolling account and the second person is associated with a second tolling account of a tolling agency that operates the tolling service server;

receiving, at the tolling service server from a toll reader, an indication that the vehicle has passed the toll reader;

and in response to receiving the indication that the vehicle has passed the toll reader, the tolling service server apportioning a toll fee among the first and second tolling accounts.

\* \* \* \* \*